United States Patent [19]

Suys et al.

[11] 4,138,361

[45] Feb. 6, 1979

[54] RADIATION-CONVERSION SCREENS

[75] Inventors: Andre R. Suys, Hove; Willy K. Van Landeghem, Sint-Gillis-Waas, both of Belgium

[73] Assignee: AGFA-GEVAERT N.V., Mortsel, Belgium

[21] Appl. No.: 775,521

[22] Filed: Mar. 8, 1977

[30] Foreign Application Priority Data

Mar. 18, 1976 [GB] United Kingdom ............... 10974/76

[51] Int. Cl.² ...................... C09K 11/46; C09K 11/24; C09K 11/12

[52] U.S. Cl. ........................... 252/301.33; 252/301.36; 252/301.4 H

[58] Field of Search ................... 252/301.33, 301.4 H, 252/301.411, 301.36

[56] References Cited

U.S. PATENT DOCUMENTS

| 3,023,313 | 2/1962 | Mater et al. | 252/301.4 H X |
|---|---|---|---|
| 3,872,309 | 3/1975 | De Belder et al. | 250/483 |
| 4,028,550 | 7/1977 | Weiss et al. | 250/483 |

Primary Examiner—F.C. Edmundson
Attorney, Agent, or Firm—A. W. Breiner

[57] ABSTRACT

A composition of matter such as an X-ray image intensifying screen which includes halide-containing phosphor particles which are admixed or combined with or have reacted with at least one metal-organic substance such that the fluorescence power of said phosphor particles is less liable to be adversely affected by moisture.

25 Claims, No Drawings

RADIATION-CONVERSION SCREENS

The present invention relates to phosphor containing compositions of matter and more particularly to improved radiation conversion screens comprising halide containing phosphors and a process for producing such compositions and screens.

A first class of radiation conversion screens are X-ray intensifying screens containing fluorescent substances which are employed for absorbing X-rays and converting said rays into light to which silver halide of a photographic material is more sensitive than to direct X-ray exposure. These screens also called radiographic intensifying screens are customarily arranged inside a cassette, so that each side of a silver halide film, emulsion-coated on both sides, after the cassette has been closed is in intimate contact with an adjacent screen. In exposing the film the X-rays pass through one side of the cassette, through one entire intensifying (front) screen, through the light-sensitive silver halide film emulsion-coated on both sides and strike the fluorescent substances (phosphor particles) of the second (rear) intensifying screen. This causes both screens to fluoresce and to emit fluorescent light into at least the adjacent silver halide emulsion layer, which is inherently sensitive or spectrally sensitized to the light emitted by the screens.

A second class of radiation conversion screens are the so-called "fluoroscopic screens". Such screens have the function of producing a directly viewable image in correspondence with a pattern of penetrating radiation.

A third class of radiation conversion screens are fluorescent screens used in conjunction with a photocathode that emits photoelectrons under the influence of the fluorescent light of the screen. Such screens find application e.g. in image intensifier or image conversion tubes. In said tubes normally also a fluorescent screen is present which transforms the impact of fast moving electrons in light.

The commonly used X-ray intensifying screens comprise a support and a layer of fluorescent particles dispersed in a coherent film-forming macromolecular binder medium. Normally a protective coating is applied on top of the fluorescent layer to shield said layer from ambient influences e.g. moisture, air and mechanical abrasion.

Usually these protective coatings are composed of cellulose derivatives or synthetic polymers as described, e.g., in the U.S. Pat. No. 3,164,719 of Herbert Bauer, issued Jan. 5, 1965.

Generally, layers comprising cellulosic derivatives are somewhat permeable to moisture and therefore more hydrophobic but also more costly synthetic polymers e.g. polymers containing fluorine atoms are applied to shield the phosphor layer from moisture.

The protection from moisture is required not only to prevent the fluorescent layer from staining but also to prevent water from adsorbing to the phosphor particles. Unlike calcium tungstate a broad class of halide containing phosphors is more or less hygroscopic and even small amounts of water reduce the fluorescent light-emitting power of the phosphor after a certain time so that the intensifying screen becomes useless in the long run.

So far one has only tried to remedy these defects as described in the U.S. Pat. Nos. 3,164,719, already mentioned hereinbefore and 3,836,784 of Clayton W. Bates and Reichard A. Wallace, issued Sept. 17, 1974, e.g. by mixing the phosphor particles with a hydrophobic polymeric binder or by coating the phosphor layer with a special protective highly water-impermeable layer. The hydrophobic polymers have to be used in rather large amounts, which reduces the light-emitting power of the screen.

The protective layers do not always have the desired mechanical strength and adherence to the phosphor layer and often require a high temperature coating procedure because of poor solubility of the polymers.

It is an object of the present invention to provide a composition of matter, which incorporates halide-containing phosphor particles, and wherein the phosphor particles are afforded some protection against the influence of moisture and loss of fluorescence power.

It is more particularly an object of the present invention to provide highly moisture-resistant radiation conversion screens incorporating particles of a halide-containing phosphor.

It is another object of the present invention to provide a process for preparing such screens having an improved stability with respect to their fluorescent light-emitting power. Other objects will appear from the further description.

In accordance with the present invention a composition of matter is provided, which composition includes halide-containing phosphor particles, which are admixed or combined with or have reacted with at least one metal-organic substance such that the fluorescence power of said phosphor particles is less prone to be adversely affected by moisture.

Particularly effective metal organic compounds are organometallic compounds as identified hereafter.

The invention includes compositions of matter as hereinbefore defined wherein a metal-organic compound or compounds having the said effect of stabilising the phosphor against the influence of moisture is or are present at the surfaces of the phosphor particles. Such compound or compounds has or have been applied to or deposited on the phosphor particles, or result from a reaction between such phosphor particles and a substance or substances previously brought into intimate contact therewith, e.g., a substance or substances initially dissolved in a liquid medium and brought in dissolved state into contact with the phosphor particles.

The invention includes compositions of matter as hereinbefore defined wherein the phosphor particles bearing one or more metal-organic compounds affording protection against moisture are dispersed in a binder.

The invention also includes any intensifying screen consisting of or incorporating a layer formed wholly or in part of a composition of matter according to the invention as above defined, with or without any one or more of the optional features above or hereinafter referred to.

A preferred optional feature resides in the employment as agent for the purposes of reducing the adverse effects of moisture on the phosphor, of a metal-organic compound or a combination of metal-organic compounds whose potential protective power satisfies a certain test. This test (hereafter called the "Standard Test") has been devised for the purpose of assessing the level of effectiveness of any selected metal-organic compounds for phosphor protection in accordance with the invention and is as follows:

Standard test (1) An X-ray image intensifying screen (Screen A) is prepared from the following composition:

| | | |
|---|---|---|
| terbium-activated lanthanum oxybromide phosphor | 100 | g |
| organic substance (compound or combination of organic compounds) to be tested | 0.5 | g |
| poly(vinyl-n-butyral) containing 12% by weight of non-acetalized vinyl alcohol units and having an average molecular weight of 50,000 | 12.5 | g |
| methyl glycol | 6.75 | g | by ball-milling to reduce the particle size to 7 NS Hegman Fineness measured with a Hegman gage as specified in ASTM 1210, filtering the resulting dispersion, de-aerating it and applying the composition to a baryta-coated paper of 290 g per m² at a coverage of 500 g/m².

(2) A second X-ray image intensifying screen (screen B) is prepared in the same way as screen A except that the organic substance to be tested is omitted.

(3) Screen A is treated with moisture by applying onto the phosphor layer of the screen a wet circular piece of filter paper having a dry weight of 1.355 g, a diameter of 15 cm and a water content of 3.100 g, air-tightly enclosing the screen A together with the applied filter paper in a polyethylene bag, keeping the bag for 64 h at 60° C. in a ventilated cabinet and then removing the screen from the bag, removing the filter paper and drying the screen in air for 30 min at 80° C.

(4) The screens A and B (the former having been moisture-treated as above described) are subjected to an X-ray exposure while the phosphor layers are in contact with distinct areas of the same silver halide emulsion layer of a photographic material having a transparent emulsion layer support and the exposed photographic material is developed, the X-ray exposure and development being such that in the area of the emulsion layer which was in contact with screen B a spectral density of at least 1.00 above inherent fog is obtained; and the composition of the silver halide material and the development being such that gradually increasing exposures of the silver halide emulsion area in contact with screen B would give a silver image density versus log exposure curve having a gamma value (maximum gradient of the characteristic curve) of 3;

(5) the densities $D_A$ and $D_B$ obtained in the areas of the emulsion layer, which were exposed in contact with screens A and B are measured;

(6) the actual loss of fluorescent light-emitting power of the moisture-treated screen A is computed on the basis of the spectral densities $D_A$ and $D_B$ measured in step 5 above and the gamma value 3, and it is determining whether or not the fluorescent light-emitting power of screen A is at least 25% of that of screen B.

A metal-organic compound or combination of metal-organic compounds is regarded as satisfying the above Standard Test if the result of the determination in step 6 is that the fluorescent light-emitting power of screen A incorporating that compound or combination of compounds is at least 25% of that of screen B. In the most preferred embodiment of the invention the metal-organic compound or metal-organic compounds affording the moisture protection is or are such that when such compound or compounds is or are used in screen A in the Standard Test the fluorescent light-emitting power of screen A is at least 65% and most preferably at least 75% of that of screen B.

If screen B in the Standard Test were to be moisture-treated like screen A before being subjected to the exposure and development screen B would show a loss in fluorescent power of more than 90%.

As already indicated a mixture or combination of metal-organic stabilizing compounds can be employed in any one screen composition.

Preferably use is made of at least one metal-organic compound, which is colourless and yields a colourless reaction product by reaction with hydrogen chloride.

Metal-organic compounds suitable for use according to the present invention are, e.g., water-insoluble metal salts of carboxylic acids, so-called carboxylates. Preference is given to a bi- or trivalent metal e.g. barium, lead, cadmium or zinc salt of an aliphatic carboxylic acid having preferably at least 7 carbon atoms, e.g. lead stearate, barium stearate, barium 2-ethyl-hexaoate, cadmium laurate, and zinc laurate or stearate.

For the preparation of such compounds reference is made to the J. Polymer Sci. Vol. XL (1959) p.420.

The stabilizing activity of these substances is assumed to be in their ability to replace labile halogen e.g. chlorine, bromine, or iodine by an ester group —OCOR where R represents an organic group that hydrophobizes the substance onto which it has been attached.

Other metal-organic compounds for stabilizing purposes according to the present invention are water-insoluble mercaptides e.g. a tin mercaptide corresponding to the following general formula:

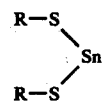

wherein R is a hydrocarbon group, preferably a hydrocarbon group containing at least 4 carbon atoms e.g. n-butyl.

It is assumed that in the stabilization the R-S-group is chemically attached to the substance containing labile halide atoms and that an exchange of halogen may take place, the mercapto group providing a water-repelling character to the substances, to which it is chemically bound.

Dialkyl metal mercaptides are prepared e.g. as described by Donald J. Cram and George J. Hammond in their book Organic Chemistry 2nd ed. (1964) McGraw-Hill Book Company Inc. New York p.552.

An interesting subclass of metal-organic compounds that satisfies the Standard Test comprises the organo-metallic compounds that can react with a labile or weakly bound halogen substituent e.g. as present in a hydrolyzable halide and/or can react with hydrogen chloride.

Preferred in that respect are organotin compounds and organobismuth compounds. Many of them are known as HCl or HBr scavenger or are known for the slow down of thermal degradation of poly(vinyl chloride).

Examples of such compounds are triphenylantimony, triphenylbismuth and tetraphenyltin.

A preferred class of organo-metallic stabilizing compounds for use according to the present invention corresponds to the following formula:

$R_mSnX_{4-m}$ wherein:

R is a hydrocarbon group, e.g. an alkyl group,

X is one to three electronegative substituents e.g. oxygen in substituted form as in an alkoxy or in a carboxylate group, or is an electronegative sulphur substituent or a water-repelling sulphur-containing substituent linked through sulphur to the tin atom e.g. a thioether, a mercaptide or xanthate group, and m is 1, 2, or 3, excluding X being three, two or one halogen atom(s) when m is 1, 2 or 3 respectively.

Examples of such compounds are dibutyl tin bis(oxooctylthioglycolate), also called dibutyltin S,S'-bis(-octylmercapto acetate) and

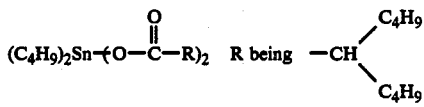

described as stabilizing agent for polyvinyl chloride by D. H. Solomon, The Chemistry of Organic Film Formers, John Wiley & Sons, Inc. New York, p.175 to 177 (1967) and dibutyltin maleate, dibutyltin lauryl mercaptide, and di(n-octyl)-tin S,S'-bis(iso-octylmercapto acetate) described by Kirk-Othmer, Encyclopedia of Chemical Technology, 2nd compl. revised edition, Vol. 21, p.390 (1965) and in the J. Polymer Sci. Part A Vol. 2 (1964) 1801–1813.

Organo-metallic compounds suitable for use according to the invention are further described in the U.S. Pat. Nos. 2,914,506 of Gerry P. Mack, Jackson Heights and Emery Parker, issued Nov. 24, 1959, 2,888,435 of James M. Wallace, Jr. issued May 26, 1959, 2,801,258 of Ernest W. Johnson, issued July 30, 1957, 2,789,102 of Elliott L. Weinberg, 2,789,103 of Elliott L. Weinberg and Louis A. Tomka, 2,789,104 of Hugh E. Ramsden, Elliott L. Weinburg and Louis A. Tomka, 2,789,105 of Louis A. Tomka and Elliott L. Weinberg, all issued Apr. 16, 1957, 2,726,227 and 2,726,254 both of William E. Leistner and Olga H. Knoepke, issued Dec. 6, 1955, in British Patent specifications 719,421 filed Dec. 1, 1954 by Metal & Thermit Corp., 728,953 filed Apr. 27, 1955 by Firestone Tire & Rubber Co., 782,483 filed Sept. 4, 1957 by Wacker-Chemie G.m.b.H. and 838,502 filed June 22, 1960 by Argus Chemical Corp.

Organo-metallic compounds within the scope of the above formula e.g. dibutyltin sulphide are also described under the heading "Physical constants of organometallic compounds" in CRC Handbook of Chemistry and Physics 55th Ed. (1974–1975) CRC Press, Inc., Cleveland, Ohio.

The composition of matter of the present invention comprises halide-containing phosphor particles, preferably inorganic halide-containing phosphor particles, by admixture combined with a said metal-organic stabilizing substance optionally in a binder medium.

In one process for preparing a composition of matter according to the present invention the halide-containing phosphor particles are allowed to come in intimate contact with the metal-organic stabilizing substance(s) in an organic liquid medium wherein said substance dissolved and thus treated particles are separated out and dried.

In one process for preparing a radiation conversion screen according to the present invention the halide-containing phosphor particles are dispersed in an organic liquid medium in the presence of (a) dissolved binding agent(s) and at least one dissolved metal-organic stabilizing substance.

According to one embodiment the dispersing proceeds in a ball-mill.

Preferably the metal-organic stabilizing substance(s) is (are) combined by admixture with the halide-containing phosphor particles in a chosen phosphor binder layer combination in an amount sufficient to maintain the fluorescent light-emitting power of the layer in a moisture treatment as defined above for screen (A) at a level of at least 25% and preferably at a level of at least 75% of the level before said treatment.

The amount of metal-organic stabilizing substance or mixture of stabilizing substances suitable for a practically useful increase in stability against moisture of the applied halide-containing phosphor particles may be determined by simple tests.

Effective amounts of metal-organic stabilizer(s), e.g. with regard to lanthanum oxybromide phosphors, are in the range of 0.05 to 10 g per 100 g of phosphor. More hygroscopic phosphors such as cesium iodide phosphors may be used in conjunction with higher amounts of stabilizer(s).

In the production of a radiation conversion screen according to the present invention the dispersion may be coated and dried on a permanent support, e.g. a cardboard or resin sheet, or coated on a temporary support to form a self-supporting sheet later on. The solvent(s) used in the preparation of the coating composition is (are) normally evaporated under reduced pressure. An ultrasonic treatment can be applied to improve the packing density and to perform the de-aeration of the phosphor-binder combination. Before the optional application of a protective coating the phosphor-binder layer may be calendered to improve the packing density (i.e., the number of grams of phosphor per cm3 of dry coating).

Self-supporting screens of this invention can also be prepared by means of "hot-pressing", excluding the use of solvent(s) in the manufacture of the screens.

To provide high X-ray efficiency it is preferable that a minimum amount of binder be employed in the fluorescent layer. However, the less binding agent the more brittle the layer, so that a compromise has to be made. The thicker the fluorescent layer of a screen, the higher its intensification, but the image sharpness is decreased accordingly so that a balance between speed and definition is chosen. Suitable binders for use in the preparation of the fluorescent layers are, e.g., a cellulose acetate butyrate, polyalkyl (meth)acrylates, e.g. polymethyl methacrylate, a polyvinyl-n-butyral, a copoly(vinyl acetate/vinyl chloride) and a copoly(acrylonitrile/-butadiene/styrene) or a copoly(vinyl chloride/vinyl acetate/vinyl alcohol) or mixtures thereof.

Optionally, a light-reflecting layer is provided between the fluorescent layer and its support to enhance the exposure of the silver halide emulsion material.

To the phosphor-containing layer a protective coating may be applied preferably having a thickness in the range of 5 to 25 μm and being composed of any film-forming polymeric material that is photographically inert towards a silver halide emulsion layer.

Polymeric materials suitable for that purpose include e.g. cellulose derivatives e.g. cellulose nitrate, cellulose triacetate, cellulose acetate propionate, cellulose acetate butyrate, polyamides, polystyrene, polyvinyl acetate, polyvinyl chloride, silicone resins, poly(acrylic ester)

and poly(methacrylic ester) resins, and fluorinated hydrocarbon resins, and mixtures of the foregoing materials. Representative examples of various individual members of these binder materials include the following resinous materials: poly(methyl methacrylate), poly(n-butyl methacrylate), poly(isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene and tetrafluoroethylene, and poly(vinylidene fluoride).

According to a special embodiment the outer face of the screen intended for contact with the photographic silver halide emulsion material contains a solid particulate material that has a static friction coefficient ($\mu$) at room temperature (20° C.), of less than 0.50 on steel.

Antistatic substances can be applied to the screen to reduce the risk of electrical potential differences resulting in sparking. For example, the screens are treated with the "ANTI-STAT" 6 spray, which leaves on odourless transparent antistatic deposit. ANTI-STAT is a trade name of Braun Laboratories Div. Barrett Chemical Co. Inc., Philadelphia, Pa., U.S.A.

At least a part of the halide containing phosphor particles in the present composition of matter are preferably halide-containing rare earth metal compounds, in which the host metal of the phosphor is a rare earth metal and the activator consists of one or more other rare earth metals. For example, these phosphors contain yttrium, gadolinium, lanthanum, or cerium as a host metal and at least one of the metals of the group of terbium, europium, dysprosium, thulium, samarium and ytterbium as activator metal.

Preferred phosphors of this class correspond to one of the following general formulae:

$$La_{(1-n)}Tb_n{}^{3+}OX$$

wherein X is halogen such as e.g. chlorine, bromine, or fluorine, and n is from 0.006 to 0.0001.

The halogen is present preferably in the range of between about the stoichiometric amount and about 2.5 percent deviated thereof; or $$La_{(1-w-y)}OX: Tb_wYb_y$$

wherein X is chlorine or bromine
w is 0.0005 to 0.006 mole of the oxyhalide, and
y is 0.00005 to 0.005 per mole of the oxyhalide.
Cerium may replace lanthanum in an amount described in the U.K. Patent Specification No. 1,247,602 filed Oct. 9, 1969 by General Electric and Co.

The preparation of terbium-activated lanthanum oxychloride and lanthanum oxybromide phosphors emitting visible light is described, e.g., in U.K. Patent Specification No. 1,247,602 mentioned hereinbefore, the French Patent Nos. 2,021,398 and 2,021,399 both filed Oct. 23, 1969 by General Electric and Co, and the published German Patent Applications (DOS) 1,952,812 filed Oct. 21, 1969 and 2,161,958 filed Dec. 14, 1971 both by General Electric and Co. Suitable lanthanum oxychloride-fluoride phosphors are described in the published German Patent Application (DOS) 2,329,396 filed June 8, 1973 by Siemens A. G.

The preparation of lanthanum oxyhalides activated with terbium and ytterbium is described, e.g., in the published German Patent Application (DOS) 2,161,958 mentioned hereinbefore.

Oxyhalides of lanthanum and gadolinium activated with thulium are described e.g. for use in radiographic intensifier screens in the U.S. Pat. No. 3,795,814 of Jacob G. Rabatin, issued Mar. 5, 1974.

An ultraviolet-emitting phosphor is barium fluorochloride activated with europium(II) as described, e.g., in the French Pat. No. 2,185,667 filed May 23, 1973 by Philips Gloeilampenfabrieken N.V. According to an embodiment the present composition of matter is a composition wherein at least a part of said phosphor particles consists of said barium fluoride chloride.

An X-ray image intensifier screen employing rather hygroscopic sodium-activated cesium iodide is described in the U.S. Pat. No. 3,836,784, already mentioned hereinbefore. According to another embodiment the present composition of matter is a composition wherein at least a part of the phosphor particles is sodium-activated cesium iodide.

The thickness of the supported fluorescent layer may vary within a broad range but is preferably in the range of 0.05 to 0.5 mm.

The coverage of the phosphors is, e.g., in the range of approximately 200 to 800 g/sq.m and preferably approximately 300 to 600 g/sq.m.

The image sharpness obtainable with a fluorescent screen-silver halide material system can be improved considerably by incorporating a fluorescent light-absorbing dye, called "screening dye" herein, into the fluorescent screen material, e.g. into the fluorescent layer or into a layer adjacent thereto e.g. into a subjacent anti-reflection layer. As the oblique radiation covers a large path in the screen material, it is attenuated by the screening dye or dyes to a greater extent than the radiation impinging normally. The term "screening dye" used herein includes dyestuffs (i.e., coloured substances in molecularly divided form) as well as pigments.

Diffuse radiation reflecting from the support of the fluorescent screen material can be mainly attenuated in an anti-reflection layer containing the screening dyes subjacent to the fluorescent layer.

The screening dye does not have to be removed from the fluorescent screen material and may therefore be any dye or pigment absorbing in the emission spectrum of the fluorescent substance(s). Thus black substances such as carbon black particles of an average size of 0.15 to 0.60 $\mu$m incorporated in said anti-reflection layer or the phosphor layer yield quite satisfactory results.

The screening dye(s) is (are) preferably used in the fluorescent layer e.g. in an amount of at least 0.5 mg per sq.m. When used in the anti-reflection layer, however, the amount of said dye(s) is not limited.

Suitable screening dyes are Neozapon Fire Red (C.I. Solvent Red 119) and dyes such as C.I. Solvent Red 8, 25, 30, 31, 32, 35, 71, 98, 99, 100, 102, 109, 110, 118, 124, and 130.

The non-self-supporting phosphor-binder composition may be coated on a wide variety of supports, e.g. cardboard and plastic film, e.g. polyethylene terephthalate film. A support used in a fluorescent screen of the present invention may be coated with (a) subbing layer(s) to improve the adherence of the fluorescent coating thereto.

Screens according to the present invention may be used in conjunction with light-sensitive silver halide materials emulsion-coated on one or both sides of the support.

The following examples illustrate the present invention without, however, limiting it thereto.

EXAMPLE 1

Preparation of screen A 100 g of terbium-activated lanthanum oxybromide phosphor, 0.5 g of the stabilizing compound dibutyltin-S,S'-bis(n-octylmercapto acetate), 12.5 g of poly(vinyl-n-butyral) still containing 12% by weight of non-acetalized vinyl alcohol units and having an average molecular weight of 50,000, and 6.75 g of methyl glycol were ball-milled to a fineness of grind corresponding with 7 NS Hegman Fineness-of-Grind measured with the Hegman gage as specified in ASTM D1210, whereupon the dispersion obtained was filtered and after de-aeration coated onto a baryta-coated paper of 290 g per sq.m at a coverage of 500 g per sq.m to form said screen A.

Preparation of screen B

The X-ray image intensifying screen (B) was manufactured as described for screen (A) with the difference that the stabilizing compound was omitted from the composition of the screen.

Moisture treatment

The moisture treatment of screens (A) and (B) proceeded by covering congruently the phosphor coating of each of the screens (A) and (B) with a wet circular piece of filter paper having a weight of 1.355 g in dry state, a diameter of 15 cm, and a water content of 3.100 g. Subsequently, the covered screens (A) and (B) were separately packed air-tight in a polyethylene bag and kept at 60° C. for 64 h in a ventilated cabinet. The screens (A) and (B) were removed then from the bag and after removal of the filter paper dried in the air for 30 min at 80° C.

X-ray exposure and development

The thus moisture-treated screens (A) and (B) and a screen (B[1]) which was like screen B but was untreated with moisture, were exposed to X-rays in contact with a CURIX RP1 film (CURIX is a trade name of the Applicant for a medical X-ray film). The exposure was effected to such a degree that after development for 23 s at 35° C. in Agfa-Gevaert's hardening developer G 138 containing hydroquinone and 1-phenyl-3-pyrazolidinone as developing agents and glutaraldehyde as a hardener the area of the silver halide material exposed in contact with the untreated screen (B[1]) showed a transmission spectral density of 1.82 above fog. After gradually increasing exposures with screen (B[1]) of the above film material and said development of the film as described a silver image with a gamma ($\gamma$) of 3 is obtained.

The transmission spectral densities obtained with the moisture-treated screens (A) and (B) were 1.76 and zero above fog respectively.

The actual loss in fluorescence power of screen (A) was computed as follows:

$\Delta$ density ($\Delta D$) = 1.82 − 1.76 = 0.06
$\Delta$ log exposure ($\Delta \log E$) = $\Delta D/\gamma$ = 0.06/3 = 0.02
antilog 0.02 = 1.05; 1/1.05 = 0.95
100% − 95% = 5%.

EXAMPLE 2

Preparation of screen I 5 g of a 40% by weight solution in toluene of ELVACITE 2044 (ELVACITE 2044 is a trade name of E. I. du Pont de Nemours & Co. (Inc.), Wilmington, Del., U.S.A., for a poly-n-butyl methacrylate)
100 g of LaOBr: 0.02 Tb: 0.0005 Yb phosphor particles prepared according to published German Patent Specification (Dt-OS) 2,161,958, already mentioned hereinbefore,
0.5 g of the stabilizing compound: dibutyltin-S,S'-bis(n-octyl mercaptoacetate), and
251.2 g of toluene were ball-milled for 4 h, whereupon a further amount of 10.5 g of ELVACITE 2044 (trade name) was added and ball-milling was continued up to a Hegman Fineness-of-Grind of 7 NS (average phosphor particle size 7 $\mu$m) measured with the Hegman gage as specified in ASTM D 1210.

The dispersion obtained was coated at a coverage of 500 g per sq.m of phosphor on a subbed polyethylene terephthalate support and dried.

Preparation of screen II

Screen II was prepared in the same way as described for screen I with the difference, however, that the stabilizing compound was omitted from the composition.

Moisture treatment

Circular pieces of screen I and screen II each of them having a diameter of 15 cm were separately covered congruently with a wet circular piece of filter paper having a weight of 1.355 g in dry state, a diameter of 15 cm, and a water content of 3.100 g. Each of the thus covered screens was packed separately air-tight in a polyethylene bag and kept at 60° C. in a ventilated cabinet for 64 h. Subsequently, the covered screens were removed from the polyethylene bag and the pieces of screen I and II after separation from the filter paper were dried in the air for 30 min at 80° C.

X-ray exposure and development

The moisture-treated screens I and II and an untreated screen II' were exposed to X-rays in contact with a CURIX RP1 film (CURIX is a trade mark of the Applicant for a medical X-ray film). The exposure was effected to such a degree that after development for 23 seconds at 35° C. in Agfa-Gevaert's hardening developer G 138 containing hydroquinone and 1-phenyl-3-pyrazolidinone as developing agents and glutaraldehyde as a hardener the area of the silver halide material exposed in contact with the untreated screen II' showed a transmission spectral density of 1.25 above fog.

The transmission spectral densities obtained with the moisture-treated screens I and II were 1.20 and zero above fog respectively. Computed from the difference in density obtained with the moisture-treated screen I and non-moisture-treated screen II' the actual loss in fluorescence power of screen I was but 4%.

EXAMPLE 3

Preparation of screen III 100 g of terbium-activated lanthanum oxybromide phosphor, 0.5 g of the stabilizing compound triphenylantimony, 2 g of VINYLITE VAGH (trade name of Union Carbide and Carbon Corp., New York, U.S.A.) for a copoly(vinyl chloride/vinyl acetate/vinyl alcohol) (91/3/6 by weight) dissolved in a mixture of 9.75 g of methyl ethyl ketone, 6.58 g of methyl glycol and 9.53 g of ethyl acetate were ball-milled up to a Hegman Fineness-of-Grind of 7 NS (average phosphor particle size 7 μm) measured with the Hegman gage as specified in ASTM D 1210.

The dispersion obtained was coated at a coverage of 500 g per sq.m of phosphor on a subbed polyethylene terephthalate support and dried.

Preparation of screen IV

Screen IV was prepared in the same way as described for screen III with the difference, however, that the stabilizing compound was omitted from the composition.

Moisture-treatment

Circular pieces of screen III and screen IV having each a diameter of 15 cm were separately covered congruently with a wet circular piece of filter paper having a weight of 1.355 g in dry state, a diameter of 15 cm, and a water content of 3.100 g. Each of the thus covered screens were packed air-tight separately in a polyethylene bag and kept for 64 hours at 60° C. in a ventilated cabinet. Subsequently the covered screen were removed from the polyethylene bag and the pieces of screens III and IV after separation from the filter paper were dried in the air at 80° C. for 30 min.

X-ray exposure and development

The moisture-treated screens III and IV and an untreated screen IV' were exposed to X-rays in contact with a CURIX RP1 film (trade-mark). The exposure was effected to such a degree that after development for 23 s at 35° C. in Agfa-Gevaert's hardening developer G 138 containing hydroquinone and 1-phenyl-3-pyrazolidinone as developing agents and glutaraldehyde as a hardener the area of the silver halide material exposed in contact with the untreated screen IV' showed a transmission spectral density of 1.70 above fog.

The transmission densities obtained with the moisture-treated screens III and screen IV were 1.48 and zero above fog respectively.

Computed from the difference in density obtained with the moisture-treated screen III and non-moisture-treated screen IV' the actual loss in fluorescence power of said screen III was 15%.

EXAMPLE 4

Preparation of screen V 2 g of VINYLITE VAGH (trade mark), 9.75 g of methyl ethyl ketone, 6.58 g of methyl glycol, and 9.53 g of ethyl acetate were mixed with 0.5 g of the dispersing agent GAFAC RM-710, GAFAC being a trade-name of Antara Chemicals - General Aniline & Film Corporation, New York (see Chem. Eng. News 40 (1962) No. 16 p.87) (GAFAC RM-710 is a mixture of:

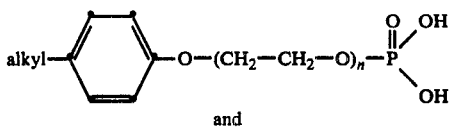

and

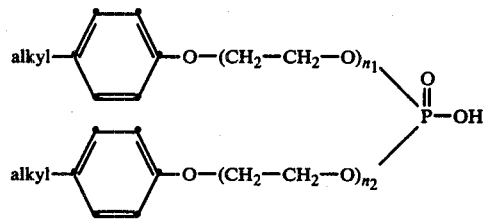

$n = 15$ to $20$
$n_1 + n_2 = 15$ to $20$
alkyl = C15 to C20).

Subsequently 100 g of sodium-activated cesium iodide were added together with 0.96 g of dibutyltin-S,S'-bis(n-octyl mercaptoacetate). With stirring 7.61 g of VINYLITE VAGH (trade name) and 9.6 g of PLEXISOL B372 (PLEXISOL B 372 is a trade name of Röhm & Haas G.m.b.H., Darmstadt, W.-Germany, for a 30% by weight solution of polyethyl acrylate in ethyl acetate) were added.

The solid content of the resulting dispersion was 72%.

The phosphor dispersion obtained was coated on a subbed polyethylene terephthalate support at a coverage of 500 g per sq.m and dried in the air.

Preparation of screen VI

Screen VI was prepared in the same way as described for screen V with the difference, however, that the stabilizing compound was omitted from the composition. The dispersion turned yellow in contact with the atmosphere.

Even without moisture-treatment as defined in Examples 1 to 3 the screen VI already showed a considerable loss in fluorescence power as compared with screen V that has been subjected to such treatment but in which the stabilizing compound maintained the fluorescence power at a level still useful for practical purposes.

EXAMPLE 5

Example 1 was repeated but instead of S,S'-bis(n-octylmercaptoacetate)-dibutyltin the same amount of $(C_4H_9)_2Sn(OOC\text{-}CH_2\text{-}CH_2\text{-}SH)_2$ prepared as follows was used as stabilizing compound. The same good results were obtained.

Preparation of $(C_4H_9)_2Sn(OOC\text{-}CH_2\text{-}CH_2\text{-}SH)_2$ 0.02 mole of $(C_4H_9)_2SnO$ was added to 125 ml of toluene with stirring so as to form a white suspension. To this suspension 0.05 mole of thiopropionic acid was added slowly. The mixture was stirred with heating for 5 hours whereupon the water azeotrope formed was distilled. The remaining mixture was filtered and the filtrate was concentrated by evaporation under reduced pressure. The residue was recrystallized from ethanol. Melting point: 148° C.

We claim:

1. A composition of matter which includes halide containing phosphor particles selected from the group consisting of (1) halide-containing rare earth metal compounds in which the host metal of the phosphor is a rare earth metal and the activator consists of one or more other rare-earth metals; (2) barium fluoride-chloride activated with europium (II), and (3) a cesium iodide, said particles being combined with at least one metal-organic substance in an amount whereby the fluorescence power of said phosphor particles is more resistant to adverse affects of moisture thereon in comparison to an identical composition of matter which does not include said metal-organic substance wherein said metal-organic substance is a member selected from the group consisting of:
- (A) water-insoluble metal carboxylates,
- (B) water-insoluble mercaptides, and
- (C) organo-metallic compounds selected from the group consisting of organoantimony, organobismuth and organotin.

2. A composition according to claim 1, wherein said metal-organic substance corresponds to the following formula:

$$R_m \cdot SnX_{4-m}$$

wherein:
R is a hydrocarbon group,
X is one to three electronegative substituents,
m is 1, 2 or 3, excluding X being three, two or one halogen atom(s) when m is respectively 1, 2 or 3.

3. A composition according to claim 2, wherein X is an alkoxy or a carboxylate group or X is sulphur or a water-repelling sulphur-containing substituent linked through sulphur to the tin atom.

4. A composition according to claim 2, wherein X is a thioether, a mercaptide group or a xanthate group.

5. A composition according to claim 4, wherein said metal-organic substance is dibutyltin maleate, dibutyltin lauryl mercaptide, dibutyltin S,S'-bis(n-octyl mercapto acetate), di(n-octyl)-tin S,S'-bis(iso-octyl mercaptoacetate) or dibutyltin bis (β-mercaptopropionate).

6. A composition according to claim 1, wherein at least a part of the halide-containing phosphor particles are halide-containing rare-earth metal compounds in which the host metal of the phosphor is a rare-earth metal and the activator consists of one or more other rare-earth metals.

7. A composition according to claim 6, wherein the host metal is yttrium, gadolinium, lanthanum or cerium and the activator metal at least one of the metals of the group of terbium, europium, dysprosium, thulium, samarium and ytterbium.

8. A composition according to claim 6, wherein the rare-earth metal compound corresponds to one of the following formulae:

$$La_{(1-n)}Tb_n^{3+}OX$$

wherein
X is halogen such as e.g. chlorine, bromine, or fluorine, and
n is from 0.006 to 0.0001,
or $$La_{(1-w-y)}OX: Tb_w Yb_y$$

wherein
X is chlorine or bromine
w is 0.0005 to 0.006 mole of the oxyhalide, and
y is 0.00005 to 0.005 per mole of the oxyhalide.

9. A composition according to claim 1, wherein said metal-organic substance comprises one or more organo-metallic compounds.

10. A composition according to claim 1, wherein said metal-organic substance is present at the surfaces of the phosphor particles.

11. A composition according to claim 1, wherein the phosphor particles bearing said metal organic substances are dispersed in a binder.

12. A composition according to claim 1, wherein said metal-organic substance is a colorless compound and yields colorless compounds on reaction with hydrogen chloride.

13. A composition according to claim 1, wherein said metal-organic substance is a water-insoluble metal carboxylate.

14. A composition according to claim 13, wherein said carboxylate is a bi- or trivalent metal salt of an aliphatic carboxylic acid having at least 7 carbon atoms.

15. A composition according to claim 14, wherein said salt is a barium, lead, cadmium or zinc salt.

16. A composition according to claim 1, wherein said metal-organic substance is a water-insoluble mercaptide.

17. A composition according to claim 16, wherein said mercaptide is a tin mercaptide corresponding to the following general formula:

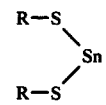

wherein:
R is a hydrocarbon group containing at least 4 carbon atoms.

18. A composition according to claim 1, wherein said metal-organic substance is an organo-metallic compound which will react with a labile or weakly bound halogen substituent and/or with hydrogen chloride.

19. A composition according to claim 1, wherein said metal-organic substance is triphenylantimony, triphenylbismuth or tetraphenyltin.

20. A composition according to claim 1, wherein at least a part of the halide-containing phosphor particles are barium fluoride chloride particles activated with europium(II).

21. A composition according to claim 1, wherein at least a part of the halide-containing phosphor particles are sodium-activated cesium iodide particles.

22. A composition according to claim 1, wherein the phosphor particles and said metal-organic substance are present in a binder medium composed of a cellulose acetate butyrate, a polyalkyl (meth)acrylate, a polyvinyl-n-butyral, a copoly(vinyl acetate/vinyl chloride), a copoly(acrylonitrile/butadiene/styrene) or a copoly(vinyl chloride/vinyl acetate/vinyl alcohol) or mixtures thereof.

23. The composition of matter of claim 1 wherein said particles and metal-organic substance are combined as a physical admixture.

24. The composition of matter of claim 1 wherein said particles and metal-organic substance are combined by chemical reaction.

25. The composition of matter of claim 1 in which the organo-metallic substance is an organo-metallic compound selected from the group consisting of triphenylantimony, triphenylbismuth, tetraphenyltin and compounds of the formula:

$$R_m SnX_{4-m}$$

wherein:
R is a hydrocarbon group,
X is one to three electronegative substituents,
m is 1, 2, or 3, excluding X being three two or one halogen atom(s) when m is respectively 1, 2, or 3.

* * * * *